United States Patent
Ashish et al.

(10) Patent No.: US 7,680,198 B2
(45) Date of Patent: Mar. 16, 2010

(54) ADAPTIVE BIT/POWER LOADING TECHNIQUE FOR A MULTICARRIER COMMUNICATION SYSTEM

(75) Inventors: Pandharipande Ashish, Yongin-si (KR); Ho Yang, Yongin-si (KR); Hyoung-Woon Park, Seongnam-si (KR); Ho-Jin Kim, Seoul (KR); Young-Ho Jung, Yongin-si (KR)

(73) Assignee: Samsung Electronics Co., Ltd. (KR)

(*) Notice: Subject to any disclaimer, the term of this patent is extended or adjusted under 35 U.S.C. 154(b) by 991 days.

(21) Appl. No.: 11/089,220

(22) Filed: Mar. 24, 2005

(65) Prior Publication Data

US 2006/0056527 A1 Mar. 16, 2006

(30) Foreign Application Priority Data

Sep. 14, 2004 (KR) .................... 10-2004-0073403

(51) Int. Cl.
*H04K 1/10* (2006.01)
*H04B 7/02* (2006.01)
*H04L 27/00* (2006.01)
*H03D 1/06* (2006.01)
*H04L 7/00* (2006.01)

(52) U.S. Cl. .................... 375/260; 375/267; 375/324; 375/348; 375/358

(58) Field of Classification Search ................ 375/260, 375/267, 324, 348, 358
See application file for complete search history.

(56) References Cited

U.S. PATENT DOCUMENTS

| | | | | |
|---|---|---|---|---|
| 5,479,447 A * | 12/1995 | Chow et al. | .................. | 375/260 |
| 6,075,821 A * | 6/2000 | Kao et al. | .................... | 375/260 |
| 6,181,714 B1 * | 1/2001 | Isaksson et al. | .............. | 370/491 |
| 6,298,092 B1 * | 10/2001 | Heath et al. | .................... | 375/267 |
| 6,377,631 B1 * | 4/2002 | Raleigh | .................... | 375/299 |
| 6,614,836 B1 * | 9/2003 | Halford et al. | .............. | 375/152 |
| 6,985,434 B2 * | 1/2006 | Wu et al. | .................... | 370/208 |
| 6,993,293 B1 * | 1/2006 | Bevan et al. | ............. | 455/67.11 |
| 7,236,748 B2 * | 6/2007 | Li et al. | ........................ | 455/69 |
| 2001/0004389 A1 * | 6/2001 | Kimura et al. | .............. | 375/295 |
| 2002/0015438 A1 * | 2/2002 | Ishizu et al. | ................ | 375/147 |
| 2004/0141566 A1 * | 7/2004 | Kim et al. | .................... | 375/267 |
| 2005/0078759 A1 * | 4/2005 | Zhang | ........................ | 375/260 |
| 2006/0002457 A1 * | 1/2006 | Romano et al. | ............. | 375/222 |

* cited by examiner

*Primary Examiner*—Mohammad H Ghayour
*Assistant Examiner*—Sarah Hassan
(74) *Attorney, Agent, or Firm*—NSIP Law

(57) ABSTRACT

A bit/power loading method in an adaptive modulation-based multicarrier communication system computes ratios of modulation mode values to transmission power values sub-channel-by-sub-channel, selects a combination of sub-channels in which a sum of the ratios is maximized for a total number of bits to be simultaneously transmitted, and transmits signals in modulation modes corresponding to ratios of modulation mode values to transmission power values associated with the selected sub-channels. Because the bit/power loading method selects a combination of sub-channel modulation modes with the minimum total transmission power for a given number of bits on the basis of transmission power in each sub-channel modulation mode, the bits can be transmitted at the minimum transmission power in a given environment.

5 Claims, 3 Drawing Sheets

| b | 0 | 1 | 2 | 3 | 4 |
|---|---|---|---|---|---|
| $f_1(b_1)$ | 0 | 1.5 | 4.2 | 4.5 | 5 |
| $f_2(b_2)$ | 0 | 1.8 | 4 | 6.5 | 9 |
| $f_3(b_3)$ | 0 | 2 | 4.4 | 7 | 9 |

FIG.2A

ADAPTIVE BIT/POWER LOADING TECHNIQUE FOR A MULTICARRIER COMMUNICATION SYSTEM

PRIORITY

This application claims priority to an application entitled "ADAPTIVE BIT/POWER LOADING TECHNIQUE FOR A MULTICARRIER COMMUNICATION SYSTEM", filed in the Korean Intellectual Property Office on Sep. 14, 2004 and assigned Serial No. 2004-73403, the contents of which are incorporated herein by reference.

BACKGROUND OF THE INVENTION

1. Field of the Invention

The present invention relates generally to a wireless communication system based on multiple carriers, and more particularly to an adaptive bit loading technique for optimizing the performance of a wireless communication system.

2. Description of the Related Art

Interest in a multicarrier modulation technique has recently increased as a result of an increased need for high-speed data transfer. An Orthogonal Frequency Division Multiplexing (OFDM) technique serving as the multicarrier modulation technique is different from a single carrier modulation technique that must use a complex adaptive equalizer. The multicarrier modulation technique divides data into sub-channels and transmits the sub-channels that independently have Additive White Gaussian Noise (AWGN), but do not have Inter Symbol Interference (ISI).

Although the multicarrier modulation technique does not require an expensive equalizer, it does require complex power control and complex power and bit loading in order to maximize system performance.

Various bit loading algorithms have been proposed which can maximize noise margin and optimize system performance while addressing the problems related to limited bit rate. However, it is difficult for these algorithms to be applied to real systems.

Because adaptive bit loading is very sensitive to time-variant characteristics of wireless transfer media in wireless OFDM systems, it requires a feedback mechanism for feeding back a Channel Quality Indicator (CQI) to a transmitting side.

In terms of a wireless system, an OFDM system using multiple transmit/receive antennas has been proposed to improve a data transmission rate. A multiple-input multiple-output (MIMO)-OFDM system has a very complex problem in bit loading. To address the problem in the bit loading, a greedy algorithm and other modified algorithms have been proposed as optimized algorithms. However, these algorithms require high computational complexity.

Accordingly, a need exists for an adaptive modulation technique that can be optimized in all systems while reducing implementation complexity.

SUMMARY OF THE INVENTION

Accordingly, the present invention has been designed to solve the above and other problems occurring in the prior art. Therefore, it is an object of the present invention to provide a bit/power loading method that minimizes total transmission power in an adaptive modulation-based communication system using a feedback channel.

It is another object of the present invention to provide a bit/power assignment method that optimally loads resources in all systems while reducing implementation complexity of an adaptive modulation mechanism.

In accordance with an aspect of the present invention, the above and other objects can be accomplished by a bit loading method in a multicarrier communication system, including computing a symbol transmission power value according to the number of bits assigned to a sub-channel-by-sub-channel symbol and dividing and loading a total number of bits to be transmitted sub-channel-by-sub-channel such that a sum of sub-channel-by-sub-channel symbol transmission power values is minimized.

Preferably, the loading includes computing initial values of symbol transmission power according to the number of bits for each sub-channel; and computing minimum transmission power and the number of bits per symbol sub-channel by sub-channel using the initial values. Preferably, the minimum transmission power is a sum of minimum symbol transmission power of a current sub-channel and symbol transmission power of a previous sub-channel for a difference between the total number of bits and the number of bits per symbol of the current sub-channel.

In accordance with another aspect of the present invention, the above and other objects can be accomplished by a bit/power loading method in an adaptive modulation-based multicarrier communication system, including computing ratios of modulation mode values to transmission power values sub-channel by sub-channel, selecting a combination of sub-channels in which a sum of the ratios is maximized for a total number of bits to be simultaneously transmitted, and transmitting signals in modulation modes corresponding to ratios of modulation mode values to transmission power values associated with the selected sub-channels.

Preferably, the ratios of modulation mode values to transmission power values are computed by referring to a table, stored in advance, indicating a transmission power value based on a modulation mode value of each sub-channel. Preferably, the transmission power value based on the modulation mode value of each sub-channel is set according to channel information received through a feedback channel.

In accordance with yet another aspect of the present invention, the above and other objects can be accomplished by a bit/power loading method in an adaptive modulation-based multicarrier communication system, including computing transmission power in each modulation mode of at least one sub-channel according to channel information received from a terminal, selecting at least one combination of sub-channel modulation modes with minimum total transmission power for transmitting a total number of bits, and simultaneously transmitting the total number of bits according to the selected sub-channel modulation mode combination.

BRIEF DESCRIPTION OF THE DRAWINGS

The above and other objects, features and other advantages of the present invention will be more clearly understood from the following detailed description taken in conjunction with the accompanying drawings, in which:

FIG. 2A is a table illustrating transmission power values according to the number of sub-channel-by-sub-channel bits to be referred to in the bit/power loading method in accordance with a preferred embodiment of the present invention.

DETAILED DESCRIPTION OF THE PREFERRED EMBODIMENTS

A bit/power loading method in accordance with preferred embodiments of the present invention will be described in detail herein below with reference to the accompanying drawings.

Figure 1:
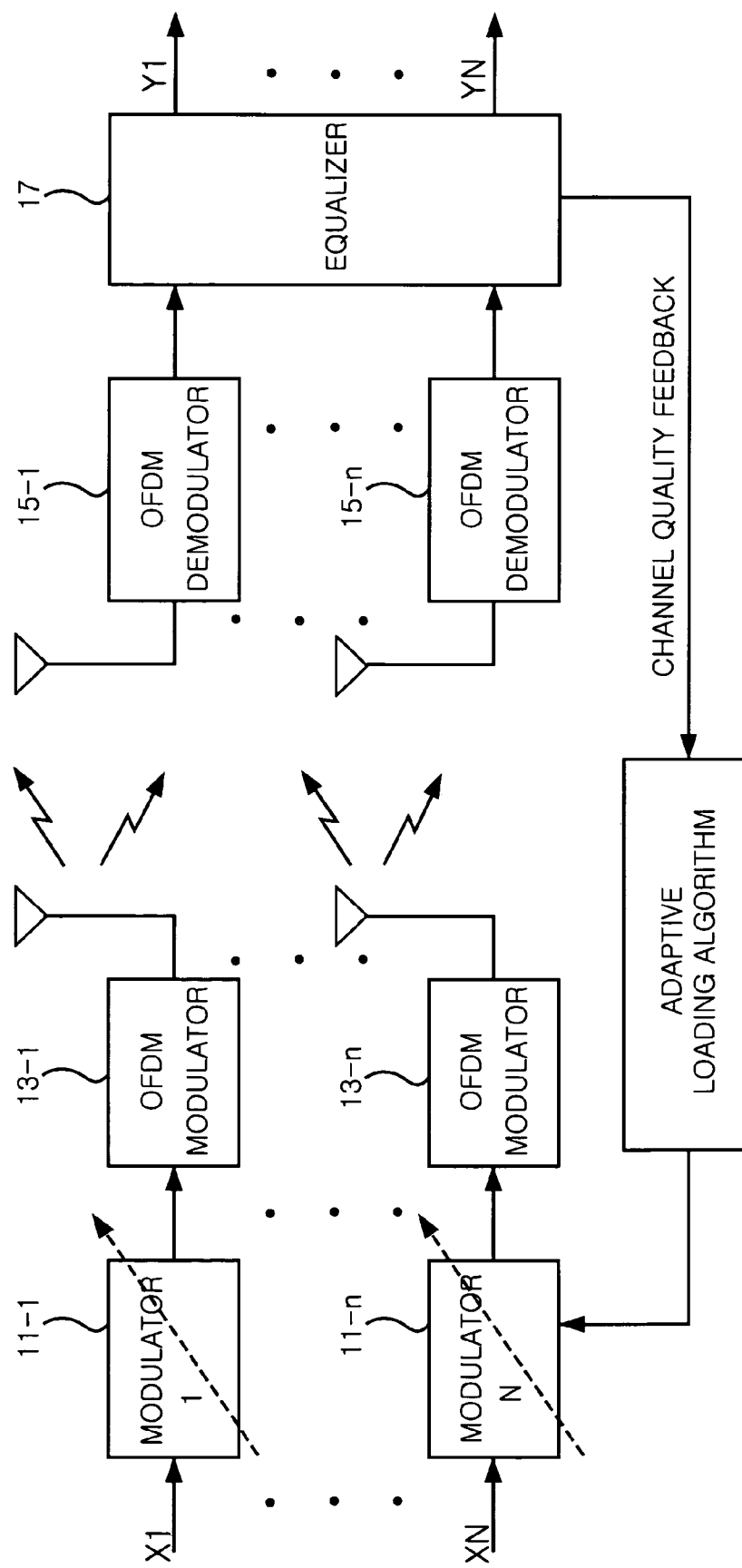
FIG. 1 is a block diagram illustrating an Orthogonal Frequency Division Multiplexing/Multiple-Input Multiple-output (OFDM/MIMO) system to which a bit/power loading method is applied in accordance with a preferred embodiment of the present invention.

A block diagram illustrating an Orthogonal Frequency Division Multiplexing/Multiple-Input Multiple-output (OFDM/MIMO) system to which a bit/power loading method is applied in accordance with a preferred embodiment of the present invention is shown in FIG. 1. The OFDM/MIMO system in accordance with the preferred embodiment of the present invention includes a transmitter and a receiver that have M tones and N antennas, respectively.

As illustrated in FIG. 1, the transmitter of the OFDM/MIMO system modulates bitstreams input thereinto by means of a plurality of modulators 11-1 to 11-n. The modulated bitstreams are inverse Fourier transformed by OFDM modulators 13-1 to 13-n, and the inverse Fourier transformed bitstreams are transmitted through transmit antennas. Meanwhile, OFDM demodulators 15-1 to 15-n demodulate signals received by receive antennas of the receiver, and an equalizer 17 detects transmitted symbols from the demodulated signals. The receiver produces channel quality information using outputs of the equalizer 17, and feeds back the produced channel quality information to the transmitter. The transmitter transfers adaptive loading information to the modulators 11-1 to 11-n using the channel quality information through an adaptive loading algorithm 19.

It is assumed that a transmission channel is a Rayleigh fading, frequency selective and quasi-static channel, and that the transmitter receives an error free feedback signal.

Error-free feedback is ensured through an error correction mechanism. A cyclic prefix ensures that a sub-channel of each OFDM is a flat fading channel. Accordingly, the equalizer 17 of the receiver searches for a symbol $X_j$ from $Y_j = h_j [X_1, \ldots, X_N]T + v_j$, where $h_j$ is a 1×N channel vector between N transmit antennas and a $j^{th}$ receive antenna, T denotes a transpose, and $v_j$ is receiver noise.

First, the receiver estimates a channel through various channel estimation techniques and generates an estimation value. A channel estimation parameter $\epsilon$ indicates channel estimation accuracy. An effective Channel Gain to Noise Ratio (CGNR) $\alpha_j$ of an equalizer output for each receive antenna channel j is measured. The receiver computes $\epsilon$ and $\alpha_j$ for each channel j=1, . . . , n. The channel estimation parameter $\epsilon$ has four values (in general $2^{L_E}$ values) indicated by two bits (in general $L_E$ bits). For example, 00 indicates a very bad channel state or a good channel state. The channel state can be associated with a tracking ability of a time-variant wireless channel according to the receiver's fast movement. Similarly, 01, 10, and 11 can be used as an estimation value indicating a bad channel state, a good channel state, or a very good channel state, respectively. When the transmitter receives, from the receiver, a feedback signal in which a Channel Estimation Quality Field (CEQF) value is set to 00, a constant modulation mode is applied without bit loading to all antennas. All the antennas use a predetermined constellation, that is, 4-Quadrature Amplitude Modulation (4QAM) or 16QAM. Similarly, when the CEQF value is 01 or 10, a predetermined number of modes, that is, two or four modulation modes, are used for bit loading. When the CEQF value is set to 11, the transmitter uses all modulation modes for bit loading. If the reliability of channel quality can be ensured, many modulation modes can be used. The present invention uses non-transmission, Binary Phase Shift Keying (BPSK), 4QAM, 8QAM, 16QAM, 32QAM, and 64QAM modulation modes. For convenience of explanation, the present invention takes into account a non-coding system. However, the above-mentioned mode can indicate a modulation level and a coding rate combination. Accordingly, the present invention can be applied to a turbo coding modulation system. To minimize an overhead of a CGNR ($\alpha_j$) feedback transmission, the preferred embodiment of the present invention quantizes $\alpha_j$ into 32 (in general $2^{L_\alpha}$) levels expressed by 5 bits. A quantized value $\beta_j$ is used in a non-loading algorithm. Accordingly, $NL_\alpha + L_\epsilon$ bits must be entirely fed back. When N=4, $L_\alpha$=5, and $L_\epsilon$=2, an overhead of 22 bits is present in the system. The 22 bits are very small as compared with the length of a forward transmission data packet.

When transmission power and the number of bits per symbol for a $j^{th}$ spatial channel are $P_j$ and $b_j$, respectively, $b_j$ is an integer determined by a selected modulation mode (i.e., a non-transmission or BPSK modulation mode, or a modulation mode with a high-order QAM constellation). Power required for a given equalizer and a Bit Error Rate (BER) $\eta_j$ is defined by $P_j = f_j(b_j, \beta_j, \eta_j)$. Here, the function $f_j(\cdot)$ varies according to a selected modulation mode, and can be generally defined by a lookup table.

The present invention aims to minimize total transmission power for a limited bit rate and a given BER. To minimize the total transmission power, the optimal number of bits per symbol $b_j$ is selected and a modulation mode for each channel is determined.

The optimal number of bits per symbol $b_j$ can be formularized as the following Equation 1.

$$\min_{\{b_j\}} \sum_{j=1}^{N} f_j(b_j) \qquad \text{Equation (1)}$$

$$\sum_{j=1}^{N} b_j = B, \quad b_j \in \{0, 1, \ldots, b_{max}\}$$

For given $\beta_j$ and $\eta_j$, a discrete set of signal points $f_j(0)$, $f_j(1), \ldots, f_j(b_{max})$ does not need to form the minimum convex hull corresponding to a requirement for optimizing a greedy algorithm. The bit-loading algorithm in accordance with the preferred embodiment of the present invention provides an optimal solution of the above Equation 1. In order for a solution of the above Equation 1 to be present, $Nb_{max} \geq B$, must be true. If $Nb_{max}=B$, a trivial solution $b^*_i = b_{max}$, where i=1, . . . , N, is obtained. It is assumed that another solution is obtained if $Nb_{max} > B$.

The above Equation 1 can be solved by solving a set of sub-problems. An optimal solution can be obtained from solutions of the sub-problems. To obtain the structure of sub-solutions, a function $\phi_j(m)$ can be expressed by the following Equation 2.

$$\phi_j(m) = \qquad \text{Equation (2)}$$

$$\min\left\{ \sum_{i=1}^{j} f_i(b_i) : \sum_{i=1}^{j} b_i = m, \text{ and } b_i \in \{0, 1, \ldots, b_{max}\} \right\}$$

Here, $\phi_j(m)$ is a total power function obtained by optimally loading m bits to j sub-channels. The above Equation 2 defines an optimal lower structure of original optimization problems. The minimum value of a cost function of the above Equation 1 can be obtained where j=N and m=B, that is, $\phi_N$(B) is defined, in the above Equation 2.

To obtain an optimal vector [$b^*_1, \ldots, b^*_N$] serving as a solution for the above Equation 1, the sub-problems given by the above Equation 2 must be solved, where j=1, ..., N and m=0, ..., B.

An algorithm for providing the optimal vector [$b^*_1, \ldots, b^*_N$] is as follows.

Step i. Initialization
  For m=0, ..., $b_{max}$
    $\phi_1(m)=f_1(m)$
Step ii. For j=2, ..., N−1
  For m=0, ..., j$b_{max}$
    $\phi_j(m)$=min {$\phi_{j-1}(m-z)+f_j(z)$:z=0, ..., $b_{max}$,0≦m−z≦(j−1)$b_{max}$}
    $z_j(m)$=arg min$_z$ {$\phi_{j-1}(m-z)+f_j(z)$:z=0, ..., $b_{max}$, 0≦m−z≦(j−1)$b_{max}$}
Step iii. $\phi_N(B)$=min$_{N-1}$ (B−z)+$f_N(z)$:z=0, ..., $b_{max}$}
  $b^*_N$=arg min$_z$ {$\phi_{N-1}(m-z)+f_N(z)$:z=0, ..., $b_{max}$}
Step iv. Initialize p=B.
  For k=N−1, ..., 1
    $b^*_k=z_k(p-b^*_{k+1})$
    $p=p-b^*_k$ A bit/power loading method of the present invention in a system where it is assumed that the number of antennas N is 3, the maximum number of bits per symbol $b_{max}$ is 4, and the total number of bits, B, capable of being loaded to all sub-channels is 8, for convenience, will be now described.

A table illustrating transmission power values according to the number of sub-channel-by-sub-channel bits to be referred to in the bit/power loading method in accordance with a preferred embodiment of the present invention is illustrated in FIG. 2A.

As illustrated in FIG. 2A, when $b_1$ values indicating the number of bits per symbol are 0, 1, 2, 3, and 4 in Channel #1, required power values $f_1(b_1)$ are 0, 1.5, 4.2, 4.5, and 5, respectively. When $b_2$ values indicating the number of bits per symbol are 0, 1, 2, 3, and 4 in Channel #2, required power values $f_2(b_2)$ are 0, 1.8, 4, 6.5, and 9, respectively. When $b_3$ values indicating the number of bits per symbol are 0, 1, 2, 3, and 4 in Channel #3, required power values $f_3(b_3)$ are 0, 2, 4.4, 7, and 9, respectively.

Figure 2B:
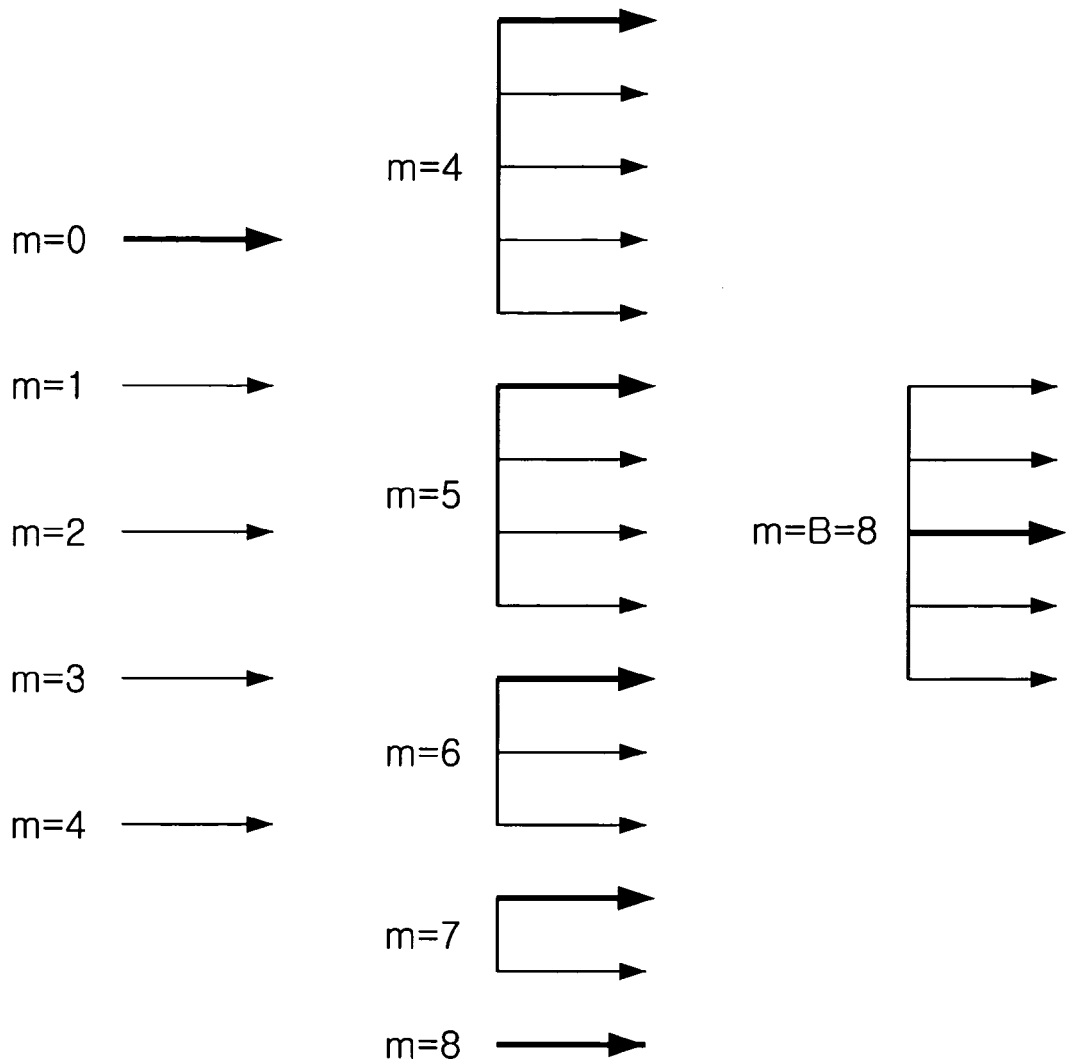
FIG. 2B is an exemplary diagram illustrating a process for computing the number of sub-channel-by-sub-channel bits and optimal transmission power on the basis of the table illustrated in FIG. 2A in accordance with a preferred embodiment of the present invention.

A conceptual diagram illustrating a process for computing optimal transmission power for the total number of bits m= 0, ..., 8 on the basis of the table illustrated in FIG. 2A is illustrated in FIG. 2B.

A bit/power loading method in accordance with a preferred embodiment of the present invention will be described with reference to FIGS. 2A and 2B.

The embodiment of the present invention produces a combination of channels capable of transmitting all bits at the minimum transmission power by taking into account channel-by-channel transmission power according to the number of bits to be transmitted. The channel-by-channel transmission power considering the number of bits can be configured in advance by the lookup table illustrated in FIG. 2A.

As illustrated in FIG. 2B, transmission power values $\phi_1(m)$ are computed until the total number of bits, m, to be transmitted through Channel #1 reaches the maximum value of $b_{max}$=4. Referring to the table (illustrated in FIG. 2A), transmission values are 0, 1.5, 4.2, 4.5, and 5, respectively, when m values indicating the total number of bits are 0, 1, 2, 3, and 4. In this case, the total transmission power $\phi_1(m)$ for Channel #1 is identical with symbol transmission power $f_1(m)$.

To compute optimal total transmission power by taking into account transmission power according to the number of bits of Channel #1 and Channel #2, a transmission power value for the number of bits $b_2$ of Channel #2 and a transmission power value of Channel #1 for a difference (m−$b_2$) between the total number of bits m and the number of bits $b_2$ of Channel #2 are computed and summed. Here, because the maximum number of bits $b_{max}$ capable of being loaded to one channel is 4, 0≦$b_2$≦$b_{max}$ and 0≦m−$b_2$≦(j−1)$b_{max}$, where j is a channel index.

Accordingly, when m is 4 and $b_2$ values are 0, 1, 2, 3, and 4, transmission power values $f_2(b_2)$ for Channel #2 are 0, 1.8, 4, 6.5, and 9, respectively. When $b_1$ values are 4, 3, 2, 1 and 0, transmission power values $f_1(b_1)$ for Channel #1 are 5, 4.5, 4.2, 1.5, and 0, respectively.

When values of $f_2(b_2)+f_1(b_1)$ are 5, 6.3, 8.2, 8, and 9 according to the $b_2$ values, the minimum transmission power $\phi(4)$ becomes 5. Accordingly, when a 4-bit signal is transmitted, it is most efficient that one symbol of 4 bits is transmitted according to a transmission power value of 5 through Channel #1.

Similarly, as mentioned above, minimum total power transmission values are 6.8, 9, 11.3, and 14, when m values are 5, 6, 7, and 8.

Continuously, a transmission power value for the number of bits $b_3$ of Channel #3 and a transmission power value for a difference (B−$b_3$) between the maximum number of assignable bits B and the number of bits $b_3$ of Channel #3 are computed and summed. Accordingly, when m=8 and $b_3$=0, the minimum transmission power value is 14. When m=8 and $b_3$=1, the minimum transmission power value is 13.3. When m=8 and $b_3$=2, the minimum transmission power value is 13.4. When m=8 and $b_3$=3, the minimum transmission power value is 13.8. When m=8 and $b_3$=4, the minimum transmission power value is 14.

As mentioned above, when the total number of bits to be transmitted through 3 channels is 8, $b_3$, $b_2$, and $b_1$ are set to 2, 2, and 4, respectively, such that the bits can be transmitted according to the minimum transmission power value of 13.4.

Although the preferred embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

As apparent from the above description, because a bit/power loading method in accordance with the present invention selects a combination of sub-channel modulation modes with the minimum total transmission power for a given number of bits on the basis of transmission power in each sub-channel modulation mode set according to channel information, the bits can be transmitted at the minimum transmission power in a given environment.

What is claimed is:

1. A bit loading method in a multicarrier communication system, comprising:
  computing a symbol transmission power value according to the number of bits assigned to a sub-channel-by-sub-channel symbol; and
  loading a total number of bits to be transmitted based on a combination of sub-channels selected in which a sum of sub-channel-by-sub-channel symbol transmission power values is minimized,
  wherein the loading comprises:
    computing initial values of symbol transmission power according to the number of bits for each sub-channel; and computing minimum transmission power and the number of bits per symbol sub-channel by sub-channel using the initial values, and the minimum transmission power is a sum of minimum symbol transmission power of a current sub-channel and symbol transmission power of a previous sub-channel for a difference between the total number of bits and the number of bits per symbol of the current sub-channel.

2. The bit loading method of claim 1, wherein a table lookup is provided to determine the symbol transmission power value according to the number of bits assigned to the sub-channel-by-sub-channel symbol.

3. The bit loading method of claim 2, wherein the symbol transmission power is computed using channel information received through a feedback channel.

4. A bit/power loading method in an adaptive modulation-based multicarrier communication system, comprising:

computing transmission power in each modulation mode of at least one sub-channel according to channel information received from a terminal;

selecting at least one combination of sub-channel modulation modes with minimum total transmission power for transmitting a total number of bits; and simultaneously transmitting the total number of bits according to the selected sub-channel modulation mode combination in which a sum of sub-channel transmission power values is minimized, wherein the selecting comprises:

computing initial values of symbol transmission power according to the number of bits for each sub-channel; and computing minimum transmission power and the number of bits per symbol sub-channel by sub-channel using the initial values, and the minimum transmission power is a sum of minimum symbol transmission power of a current sub-channel and symbol transmission power of a previous sub-channel for a difference between the total number of bits and the number of bits per symbol of the current sub-channel.

5. The bit/power loading method of claim 4, wherein the minimum total transmission power is a sum of transmission power values of sub-channels corresponding to selected sub-channel modulation mode combinations.

* * * * *